No. 721,672. PATENTED MAR. 3, 1903.
O. C. COULOM.
HOOF SHEARS.
APPLICATION FILED AUG. 27, 1902.
NO MODEL.
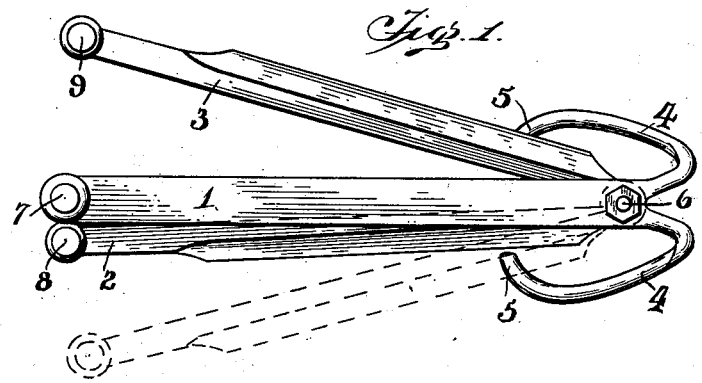
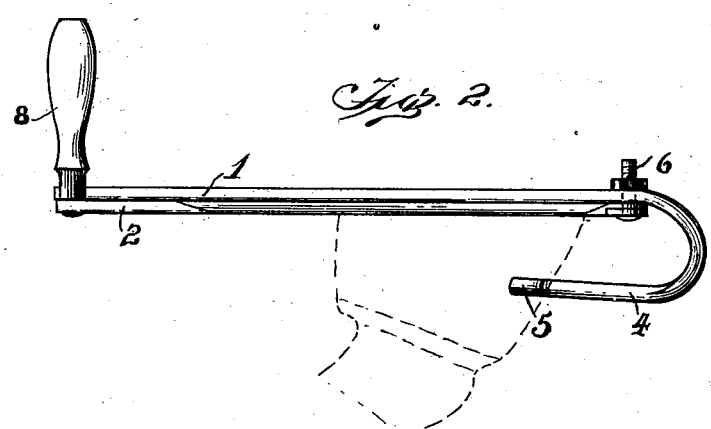
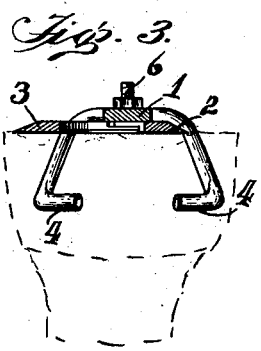 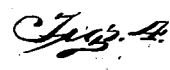
Witnesses
A. B. Williams
L. G. Handy
Inventor
Otis C. Coulom
By
Mason Fenwick & Lawrence
Attorneys

UNITED STATES PATENT OFFICE.

OTIS C. COULOM, OF MERRIMACK, NEW HAMPSHIRE.

HOOF-SHEARS.

SPECIFICATION forming part of Letters Patent No. 721,672, dated March 3, 1903.

Application filed August 27, 1902. Serial No. 121,240. (No model.)

*To all whom it may concern:*

Be it known that I, OTIS C. COULOM, a citizen of the United States, residing at Merrimack, in the county of Hillsboro and State of New Hampshire, have invented certain new and useful Improvements in Hoof-Shears; and I do hereby declare the following to be a full, clear, and exact description of the invention, such as will enable others skilled in the art to which it appertains to make and use the same.

This invention relates to improvements in hoof-paring devices; and it consists in a parer provided with a knife-carrying bar, a hoof-engaging portion, and knives pivoted to the said bar adapted to be moved inwardly and outwardly with respect thereto for paring the hoof of an animal.

It also consists in certain other novel constructions, combinations, and arrangements of parts, as will be hereinafter fully described and claimed.

In the accompanying drawings, Figure 1 is a top plan view of my improved hoof-parer. Fig. 2 is a side elevation of the same; and Fig. 3 is a transverse cross-section of the parer, showing the relation of the blades to the bar and to the hoof which is to be pared. Fig. 4 is a sectional view through one of the cutting-blades, showing the removable cutting edge.

The present invention is designed to supply hoof-paring devices which can be readily applied to the hoof of an animal and be firmly held in position thereon while the paring operation is carried on.

The hoof-parer comprises a center bar 1, to which are pivoted knives 2 and 3. One end of the bar 1 is formed with a backwardly-turned hoof-engaging portion 4. This portion, while it may be in any suitable form, is preferably made in the shape of two hooked arms, which spread apart toward their free ends, their free ends being also slightly bent inwardly, as at 5. The free end of the center bar 1 is formed with a handle, as 7, which preferably extends at right angles to the center bar, by which the bar may be readily grasped and the implement easily applied to the hoof of an animal and be properly held thereon. The knives 2 and 3 are pivoted to one face of the bar 1 by means of a suitable pivot, screw, bolt, or similar device, as 6. Both knives are pivoted to the same bolt 6, and their ends are flattened to form lapped bearings with respect to each other, as shown in the drawings. The blades 2 and 3 are formed upon their outer sides with beveled cutting edges, the said blades being beveled away from the bar 1. To the free ends of each of the cutting-blades 2 and 3 are secured suitable handles 8 and 9, which likewise extend at right angles to the blades in the same way that the handle 7 does from the bar 1. When the blades are in their folded positions, they lap somewhat upon the bar 1, their cutting edges projecting slightly beyond each side thereof. The blades of course can be spread apart to an ample degree for paring the hoof of an animal.

When the implement is to be used, the bar 1 is grasped and the hooked end 4 thereof is brought into engagement with the hoof of a horse or other animal which is to be operated upon. Then the handle of the bar 1 and one of the blades is grasped by one hand, while the handle of the other blade is grasped in the other hand, and the latter blade is moved out and in against the hoof for paring it upon one side. Next the other blade is moved in and out in a similar manner, the implement being grasped by the handle of the first blade and the bar 1 until the other side of the hoof has been properly trimmed. It will thus be seen that the hoof may be steadily held in position with respect to the knives while it is being pared and that the pivotal mounting of the knives will give a good leverage upon the hoof for the trimming or paring operation.

Of course it will be understood that any slight alterations in the form of the apparatus may be made without departing from the spirit of the invention and that the handles may be made of wood on metal spindles, as illustrated, or may be formed entirely of metal, as may be desired. The formation of the hooks 4 is such that the hoof may be grasped at any desired point for performing the paring operation, though it is usually preferable to apply the same at the front of the hoof.

The instrument is adapted for and intended to be used upon the hoofs of different animals, such as horses, cattle, and the like.

I contemplate forming the blades either with the cutting edges integral or by making the cutting edges of separate pieces and fastening them to the blade in any suitable or desirable manner, all within the spirit of the invention. The blades when not integral, as shown in Fig. 4, can be adjustably held in position and can be replaced when worn out or injured in any way.

Having thus fully described my invention, what I claim as new, and desire to secure by Letters Patent, is—

1. A hoof-parer comprising a handle-bar, a hoof-engaging portion carried thereby, and knives pivoted to said bar for paring a hoof, substantially as described.

2. A hoof-parer comprising a bar adapted to engage a hoof, and knife-blades pivoted thereto at one end, the other end of said blades being free so that the knives may be moved outwardly from the bar in opposite directions for performing the paring operation, substantially as described.

3. A hoof-parer comprising a handle-bar, a turned-up hook portion at one end thereof for engaging a hoof, knives pivoted to the said bar and adapted to be swung outwardly from each edge thereof, the outer edges of said knives being sharpened to perform the cutting operation, substantially as described.

4. A parer comprising a bar, formed with a backwardly-turned bifurcated end, a handle at the other end of said bar, knives pivoted to the bar at a single point, the outer free ends of said knives being provided with suitable handles, the said knives having their cutting edges turned outwardly, substantially as described.

5. A hoof-parer, comprising a handle-bar, and independently-movable knives pivoted thereto, the said knives being adapted to cut or pare a hoof in opposite directions from each other, substantially as described.

In testimony whereof I hereunto affix my signature in presence of two witnesses.

OTIS C. COULOM.

Witnesses:
EPHREM GUILLEMEN,
C. H. AUSTIN.